No. 836,929. PATENTED NOV. 27, 1906.
F. R. KEITH.
VEHICLE TIRE AND RIM.
APPLICATION FILED OCT. 28, 1905.
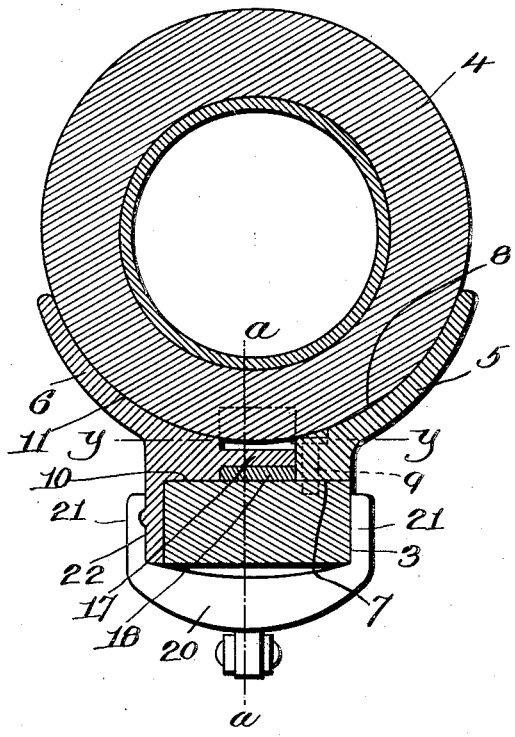
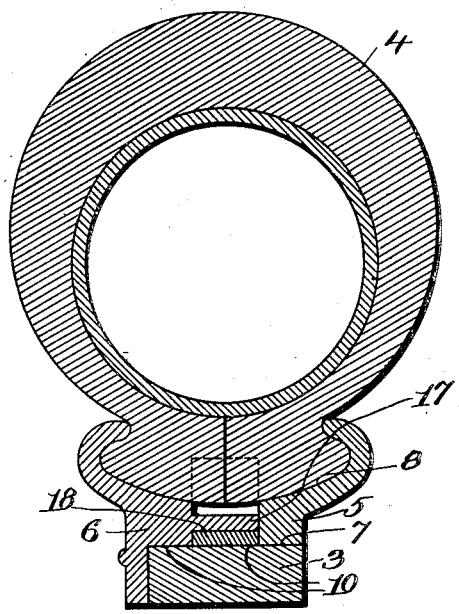
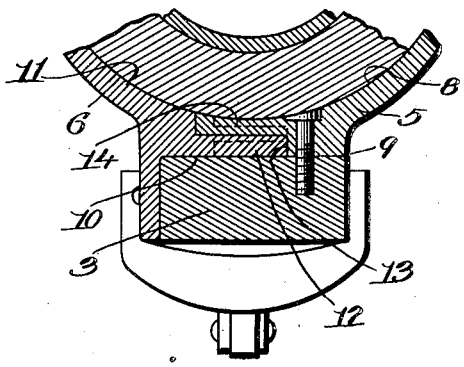
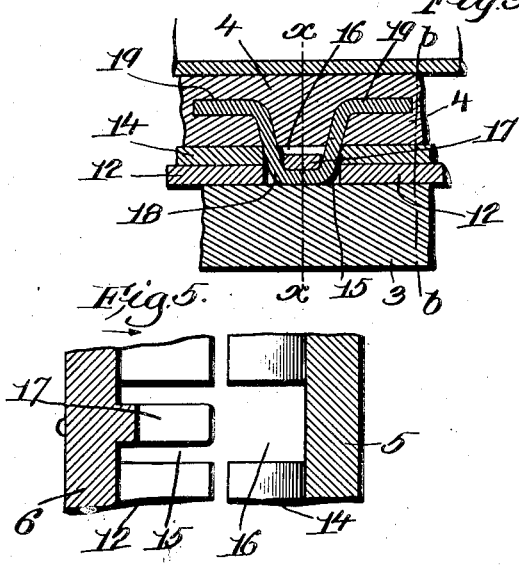
Witnesses.
W. C. Lunsford
Walter R. Trott
Inventor:
Frederick R. Keith,
by Crosby & Gregory
Attys.

UNITED STATES PATENT OFFICE.

FREDERICK R. KEITH, OF RANDOLPH, MASSACHUSETTS, ASSIGNOR OF ONE-HALF TO TIMOTHY J. REARDON, OF BOSTON, MASSACHUSETTS, AND DENNIS H. LANNAN, OF LOWELL, MASSACHUSETTS.

VEHICLE TIRE AND RIM.

No. 836,929.  Specification of Letters Patent.  Patented Nov. 27, 1906.

Application filed October 28, 1905. Serial No. 284,783.

*To all whom it may concern:*

Be it known that I, FREDERICK R. KEITH, a citizen of the United States, and a resident of Randolph, in the county of Norfolk and State of Massachusetts, have invented an Improvement in Vehicle Tires and Rims, of which the following description, in connection with the accompanying drawings, is a specification, like figures on the drawings representing like parts.

This invention has for its object to provide a novel rim for a vehicle-wheel and a novel means for securing an elastic or other tire thereto.

Most wheels which have an elastic tire have a wooden rim or felly outside of which is a metal rim or tire-seat, on which tire-seat the elastic tire is seated.

In some constructions the metal rim or tire-seat is divided longitudinally to form two sections or half-seats, which half-seats are provided with opposed slots in which is received a headed stud secured to the elastic tire.

One of the metal-rim sections or half-seats is made removable to facilitate the operation of putting the elastic tire on the vehicle or removing it therefrom.

In my improved construction I provide one of the sections of the metal rim with a laterally-extending finger which occupies the slot and which is adapted to engage a member extending from the tire, and thereby hold the tire in place.

The particular features of my invention will be hereinafter more fully described and then pointed out in the claims.

Figure 1 is a transverse section through a tire and rim embodying my invention on substantially the line $x$ $x$, Fig. 3. Fig. 2 is a similar section through a rim of the "clencher" variety embodying my invention. Fig. 3 is a section on the line $a$ $a$, Fig. 1. Fig. 4 is a section on the line $b$ $b$, Fig. 3. Fig. 5 is a section on the line $y$ $y$, Fig. 1.

In the drawings, 3 designates the ordinary felly or wooden rim of a wheel, on which the metal rim or tire-seat is placed, and 4 designates an elastic tire of any suitable or usual construction.

The metal rim or tire-seat is divided longitudinally to form the two sections 5 and 6. The section 5 is constructed with the base portion 7, which rests on the periphery of the rim 3, and with the seat portion 8, on which the elastic tire 4 rests. Said rim-section 5 is permanently secured to the felly or rim 3 in any suitable way, as by means of bolts or screws 9.

The rim-section 6 is made removable and is provided with the base 10, which rests on the wooden rim 3, and with the tire-seat portion 11, on which the tire rests.

The base of the section 6 is extended laterally, as at 12, to form a flange which when the two rim-sections are in place occupies an annular recess 13 in the rim-section 5 and is overlapped by the portion 14 of said section 5. The two overlapping portions 12 and 14 of the two sections are provided with opposed slots 15 and 16, and the removable section 6 has extending laterally therefrom and occupying each slot 15 a finger 17. This finger is situated slightly above the lateral flange 12, as shown in full lines, Figs. 1 and 3, and in dotted lines, Fig. 4, and it is adapted to engage a member projecting from the tire 4, thereby locking the tire in place.

In the preferred form of my invention this member is in the form of a loop 18, which extends outwardly from the elastic tire 4, and which is situated to be penetrated by the finger 17 when the parts are assembled, as seen in Figs. 1 and 3. The loop 18 will preferably be made with feet portions 19, which are embedded in the material of the tire 4. In fastening the tire to the wheel the removable rim-section 6 is removed, and the tire 4 is then put in place with the loops 18 occupying the slots 16 of the fixed or non-detachable rim-section 5. The detachable rim-section 6 is then slipped into place, during which operation the flange 12 enters underneath the portion 14 of the fixed rim-section and the fingers 17 enter and penetrate the loops 18.

The removable section 6 is provided with an inwardly-extending radial flange 22, which when the said section is in place overlies the side of the rim 3. After the removable section 6 is firmly in place it is secured there by means of a U-shaped locking device 20, which preferably is pivoted to the felly or wooden rim 3 and is provided with arms 21, which embrace the wooden rim 3 and the flange 22.

The locking member 20 may be held in its operative position by any suitable locking device.

Having described my invention, what I claim as new, and desire to secure by Letters Patent, is—

1. In a vehicle-wheel, a longitudinally-divided metal rim the sections of which have opposed slots, a finger extending laterally from one section and occupying the slot therein, and a tire encircling said rim and having a member extending therefrom to be engaged by said finger.

2. In a vehicle-wheel, two rim-sections having opposed slots, one section having a laterally-extending finger occupying each slot therein, and a tire encircling said rim-sections and provided with loops which occupy the slots of the rim-sections and which are in turn occupied by said laterally-extending fingers.

3. In a vehicle-wheel, a wooden rim or felly, a metal rim encircling said wooden rim, said metal rim being divided longitudinally to form two rim-sections, said rim-sections having opposed slots, and one of said rim-sections being detachable and having an inwardly-extending radial flange which is adapted to overlie the side of the wooden rim or felly, and also having laterally-extending fingers occupying the slots therein, a tire encircling said rim and provided with loops occupying the opposed slots and occupied by the lateral fingers, and a U-shaped clamping member embracing the felly or rim and the radial flange of the detachable section.

In testimony whereof I have signed my name to this specification in the presence of two subscribing witnesses.

FREDERICK R. KEITH.

Witnesses:
LOUIS C. SMITH,
MARGARET A. DUNN.